Aug. 24, 1937.  C. B. HORSLEY  2,090,958

X-RAY APPARATUS CABLE CONSTRUCTION

Filed Feb. 27, 1937

INVENTOR
CAPERTON B. HORSLEY.
BY
Brockett, Hyde, Higley & Meyer.
ATTORNEYS.

Patented Aug. 24, 1937

2,090,958

UNITED STATES PATENT OFFICE 2,090,958

X-RAY APPARATUS CABLE CONSTRUCTION

Caperton B. Horsley, Gates Mills, Ohio, assignor to Picker X-Ray Corporation, Waite Manufacturing Division, Inc., Cleveland, Ohio, a corporation of Ohio Application February 27, 1937, Serial No. 128,247

6 Claims. (Cl. 250—34)

This invention relates to means for leading electrical cables to equipment associated with an X-ray tilting table to tilt therewith.

Objects of the present invention are to permit free tilting of the table with its attached equipment, to provide safety with long life of the cables, which may carry high tension current and be therefore relatively inflexible, and to maintain the cables clear of the operator in all table positions, all with great reliability and at a minimum expense.

My invention comprises the various features disclosed in the accompanying drawing and described in the specifications and the essential features will be set forth in the claims.

Figure 1:
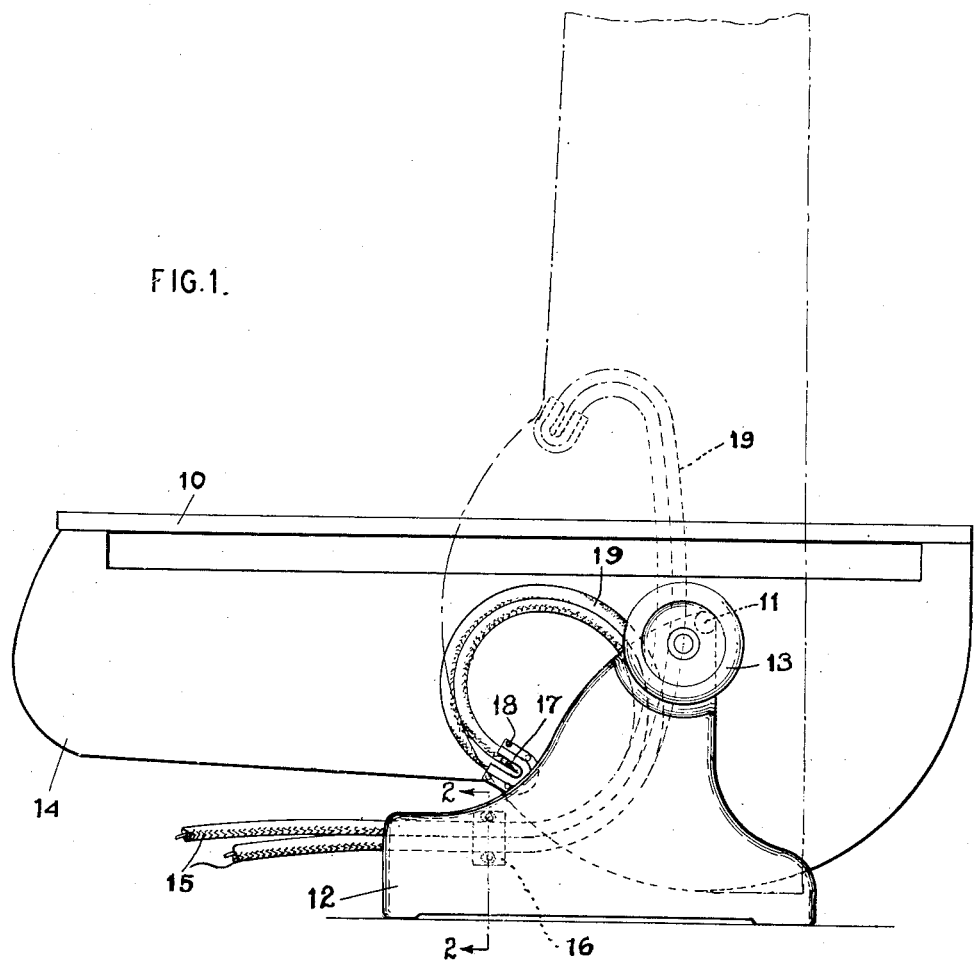
Figure 2:
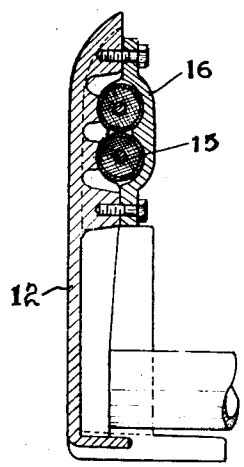

In the drawing, Fig. 1 is a side elevation of a tilting table equipped with my novel cable connections, the table being shown in full lines in horizontal position and in broken lines in vertical position; while Fig. 2 is an enlarged detail section along the line 2—2 of Fig. 1.

I have illustrated my invention as applied to a table 10 which is pivotally mounted at 11 on a pair of frame standards, one on each side of the table 10, the nearer one of which appears and is marked 12. Means is provided for rotating the table and attached mechanism about the pivots 11 and this may be either manually or motor driven. In the form shown a handwheel 13 is provided supported by the frame standard 12 and which may be suitably connected by gearing or the like to the table 10 or its connected housing so that rotation of the wheel 13 tilts the table between horizontal and vertical positions as shown.

It will be understood that with this type of equipment, various auxiliary mechanisms may be mounted beneath the table 10. For instance a grid diaphragm or X-ray tube requiring energizing cables, may be arranged for movement longitudinally of the table. Preferably all such equipment beneath the table 10 is enclosed within a housing 14, which may comprise simply the usual pair of skirts or aprons at the sides of the table, and electrical conductors must be supplied to provide current for operating the devices there located.

At 15 I have indicated a pair of high tension cables suitable for supplying current to high tension equipment within the housing 14. It will be understood that such cables are heavily insulated and therefore fairly stiff, although slightly flexible. Such cables are therefore difficult to connect to a device such as the table 10 and the housing 14 without interfering with the operator and/or with ease of movement of the apparatus about its pivotal mounting. The present invention is directed toward supplying such a cable arrangement as will satisfy all of the requirements for this type of apparatus.

To this end a loop portion of each cable is provided between the frame standard and the housing, fixed at each end and arranged to accommodate tilting movement of the table. In the form shown the cables 15 are led substantially horizontally along a lower part of the side frame standard 12 and secured to the standard by a suitable cap or clip 16, best seen in Fig. 2. In this view it will be noted that the standard 12 is flanged about the edges to provide strength and also to accommodate the large cables. The cables then curve between the standard 12 and housing 14 toward the pivot 11 extending first inwardly toward said pivot and then outwardly therefrom until substantially a complete circle or one loop of a spiral has been formed when the cables have reached the point 17. At this point the cables enter the housing 14 and are connected to equipment which they serve within the housing. The means for securing the cables at the point 17, as illustrated, is a U-shaped member 18 which holds the cables extending upwardly and substantially tangent to the arc described by the point 17 as the table and housing are moved from the full line position of Fig. 1 to the vertical or broken line position thereof.

It will be noted from the above construction that as the table moves toward the vertical position the generally spiral loop or bight of the cable indicated at 19 is unrolled or opened to the broken line position, the length of cable being of sufficient length to permit this operation.

It results from the above construction that the cable at the point 17 is never disturbed, that is to say, is not bent back and forth so as to break down the insulation and the loop of the cable at 19 is always arranged in a wide sweep so that no sharp bends occur in the cable.

It will be obvious that the clip 16 which holds the cables to the frame standard 12 might be arranged somewhat farther inwardly along the cable but I prefer to keep the connection approximately where shown as this gives more play in the loop 19.

Inasmuch as equipment within the housing 14 will generally be in the upper portion thereof and movable longitudinally, it is desirable that the cables enter at the point 17 removed from the table top 10 as this gives the most advantageous arrangement of the cables within the housing.

While I have shown the loop 19 of the cable entirely on the near side of the pivot 11, it will be understood that the cable might extend about the pivot 11, but I prefer the form shown because it is a neater arrangement and provides sufficient play in the cable for the purposes set forth.

At any rate the location of the cable outside the table housing 14 permits its constant inspection, and yet affords protection from the standard 12 and from parts within the housing.

What I claim is:

1. In an X-ray tilting table apparatus having a table and housing pivotally mounted on a frame having a side standard, and tiltable between horizontal and vertical positions; an X-ray tube within said housing, and a conductor cable for said tube having a curved length disposed as a loop in an upright plane between said standard and said housing.

2. In an X-ray tilting table apparatus having a table and housing pivotally mounted on a frame and tiltable to horizontal and vertical positions, an X-ray tube within said housing, a conductor cable for said X-ray tube running substantially horizontally between said frame and housing, means securing said cable to said frame, said cable thence curving substantially in a vertical plane to a point adjacent said pivot and then back to complete substantially a circle at a point on the housing near where the cable left the frame when the housing is substantially horizontal, said cable being secured to said housing at said point, and said cable being so disposed that it is unwound toward straightened position by tilting of said table toward vertical position.

3. In an X-ray tilting table apparatus having a table and a housing therebeneath pivotally mounted on a frame for tilting movement between horizontal and vertical positions, said frame comprising a standard on each side of said housing and said housing enclosing high tension equipment; the combination of an electrical conductor cable connected with said high tension equipment and secured at the point where it passes out of said housing by means holding said cable extending upwardly and substantially tangent to the circle described by said point about said pivotal mounting, said cable then curving inwardly toward said pivotal mounting and then downwardly and outwardly from said pivotal mounting and there secured to the inner face of one of said standards.

4. In an X-ray tilting table apparatus having a table and a housing therebeneath pivotally mounted on a frame for tilting movement between horizontal and vertical positions, said frame comprising a standard on each side of said housing and said housing enclosing high tension equipment; the combination of an electrical conductor cable connected with said high tension equipment and emerging from said housing at a point thereon farthest removed from said table, means there securing said cable to said housing in position extending upwardly along the outer face of said housing and substantially tangent to the circle described by said point about said pivotal mounting when said housing is tilted, said cable then curving inwardly toward said pivotal mounting and then downwardly and outwardly from said pivotal mounting and there secured to the inner face of one of said standards, the length of said cable between said two points of securement being sufficient to permit tilting of said table and housing between horizontal and vertical positions.

5. In an X-ray tilting table apparatus having a table and housing pivotally mounted on a frame having a side standard, and tiltable between horizontal and vertical positions, an X-ray tube within said housing, a conductor cable for said tube having a curved length disposed substantially in a vertical plane as a loop extending upwardly adjacent the top of said table, between extremities adjacent the bottom of said frame.

6. In an X-ray tilting table apparatus having a table and housing pivotally mounted on a frame having a side standard, and tiltable between horizontal and vertical positions, an X-ray tube within said housing, a conductor cable for said tube having a curved length disposed substantially in a vertical plane as a loop extending upwardly between adjacent extremities at said table and frame respectively.

CAPERTON B. HORSLEY.